Dec. 15, 1925.

J. LAZARUS 1,566,146

METHOD OF FORMING CANDY BASKETS

Filed Aug. 1, 1925

Inventor
James Lazarus
By Frederick S. Hill
Attorney

Patented Dec. 15, 1925.

1,566,146

UNITED STATES PATENT OFFICE.

JAMES LAZARUS, OF BALTIMORE, MARYLAND, ASSIGNOR OF ONE-HALF TO HYLAND P. STEWART, OF BALTIMORE, MARYLAND.

METHOD OF FORMING CANDY BASKETS.

Application filed August 1, 1925. Serial No. 47,619.

*To all whom it may concern:*

Be it known that I, JAMES LAZARUS, a citizen of the United States, residing at Baltimore, State of Maryland, have invented certain new and useful Improvements in Methods of Forming Candy Baskets, of which the following is a specification.

This invention relates to the art of candy making or forming and particularly to the art of twisting, weaving, or forming ornamental baskets, flowers, fruits, or in fact any other ornamental object from candy.

The general object of the invention is to provide a method of twisting or weaving ornamental candy baskets or articles which is very simple and by which candy baskets may be quickly made at relatively small expense.

My invention is illustrated in the accompanying drawing, wherein.

Figure 1:
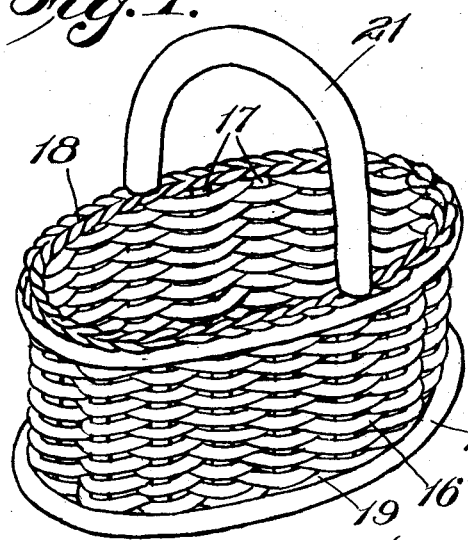
Figure 1 is a perspective view of a candy basket constructed in accordance with my invention.
Figure 2:
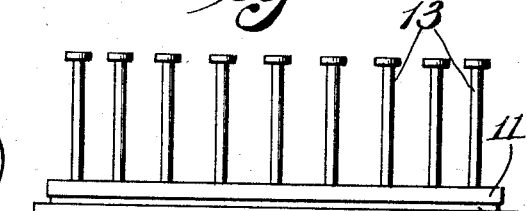
Fig. 2 is a fragmentary side elevation of the base upon which the basket is initially formed.
Figure 3:
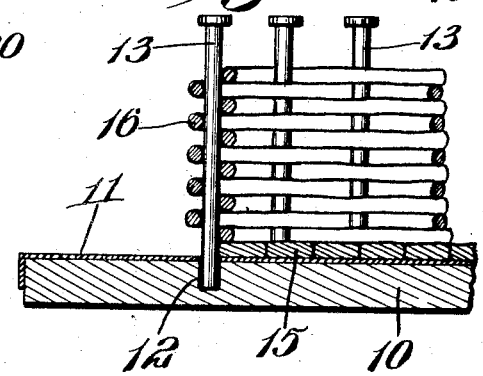
Fig. 3 is a sectional view through the base showing the interwoven wall of the basket in section.
Figure 4:
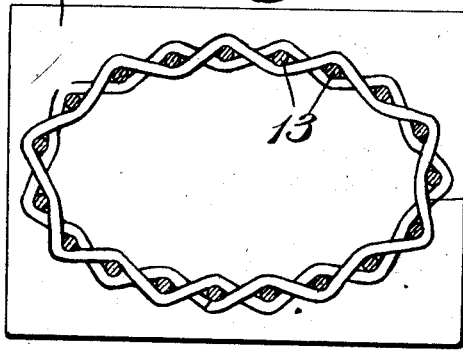
Fig. 4 is a sectional view through the interwoven wall and the pins.

In the drawing, I have illustrated the application of my invention to the making of a basket which is elliptical in plan and has vertical sides. It will be understood that the method might be used in connection with round, rectangular or any other shaped baskets and with sides either vertical or outwardly flaring.

For the purpose of carrying out my method, I provide a block or base 10 which may be made of any suitable material and which is covered upon its surface with sheet metal 11, as for instance, aluminum so as to provide a surface of such character that the candy will not stick thereto. The block 10 and the sheet metal cover 11 are formed with a plurality of openings 12 arranged, as illustrated, in an ellipse and adapted to receive therein the metallic pins 13. It will be understood that the ellipse defined by the perforations 12 has an area equal to that of the basket and the pins 13 have a depth equal to that of the projected basket.

I preferably mount the base 10 for rotation upon a workstand or table of some sort and I have illustrated the base as being mounted on a table A carried by a stem 14 rotatably mounted upon the frame.

Figure 5:
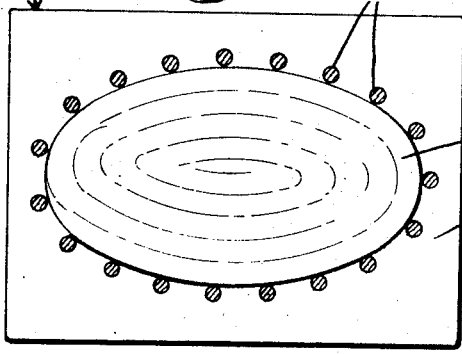
Fig. 5 is a top plan view of the base with the pins in section and showing in plan view the bottom of the basket.

In carrying out my invention, I first take a relatively long strip or rod of candy as it comes from the candy heater where the candy is kept at a temperature of at least 335° F. and preferably at a temperature of 350° F., and coil this strip, as shown in Figure 5, so as to form the bottom 15 of the basket. If candy is kept at the temperature above named, it comes from the heater in a flexible condition and in a more or less sticky condition so that as the candy is coiled, as shown, the convolutions of the coil will adhere to each other. The coil is made so as to fit within the figure defined by the openings 12 and is disposed within the pins 13 which have been disposed in these openings.

The next step is to take the strip or rod of candy as it comes from the heater and insert one end of it between two pins and then interweave this rod or strip alternately on one side or the other of the pins and carry this strip spirally around, constantly interweaving the strip in the manner shown, this woven strip being designated 16. By having an odd number of pins 13, it follows that the second tier or round of candy will be on the opposite side of any one pin from the preceding tier or round so that when the wall of the basket is entirely finished by this weaving process, the rod of candy will have been passed on both sides of any one pin 13 alternately.

Figure 6:
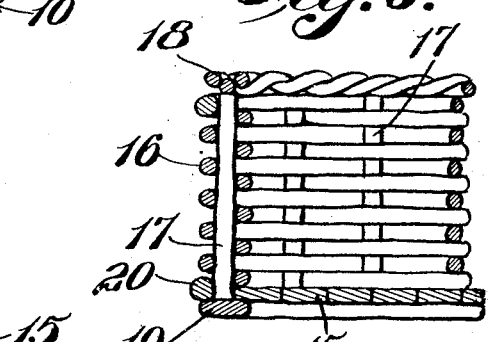
Fig. 6 is a fragmentary vertical sectional view showing the completed basket.

This candy, as above stated, when it comes from the heater at the temperature of from 335° F. to 350° F. is readily flexible and may be readily handled, and the candy tiers will adhere so that when the winding or interweaving of the side walls of the basket has been effected the convolutions forming the side wall will adhere to each other. The cooling of the candy caused by its removal from this relatively high heat forms a glaze over the surface of the candy so that when the wall has been built up it is an easy matter to remove the pins 13. These pins are all removed and in their places small straight rods 17 of candy are inserted downward through the places formerly occupied by the pins 13. The insertion of these rods is readily accomplished because of the fact that the candy has become somewhat glazed but eventually these rods will also adhere to the woven candy and become supporting means therefor preventing any one round of the wall from getting out of position with relation to any other round. After the rods 17 have been inserted, the operator takes a strip or rod of candy of a larger diameter than that heretofore used and forms the rim 18 which rests upon the top ends of the rods 17 and upon the top coil or convolution of the basket, and preferably the operator turns the basket upside down and attaches to its bottom the circular strip 19 which extends around beneath the vertical rods 17. This portion 19 preferably extends out below the lowest convolution of the interwoven wall, as shown in Figure 6, and the operator then forms a relatively large rod of candy into an elliptical band 20 which extends partially over this base ring 19 and partially over the lowermost convolutions or rounds of the wall.

After the body of the basket is completed a handle 21 also formed of candy is to be attached at its ends to the side walls and extends over the middle of the basket in the usual manner. The body of the basket may be then ornamented with candy flowers, candy rosettes, or any other ornamental work of this character and in the usual manner well known to candy makers. All of the several elements of the basket will adhere together so as to form an integral and complete whole, the complete structure having the form of a perfectly uniform, well-made basket of candy and simulating in every respect a basket of this size or type.

While it might be possible for an expert candy maker to make a basket in the course of a day's work, it would be a difficult operation, whereas by using the base 10 with the upwardly extending pins 13 and using the method which I have stated, a basket of candy may be made in a very short time, particularly if the base 10 is rotatably mounted so that the operator as he weaves may simply sit in front of the table and guiding the candy rod with one hand back and forth between the pins 13, rotate the table with the other hand or by a motor at a slow rate of speed. An assistant hands the several candy rods and other elements to the operator and a large number of baskets may be thus quickly and expeditiously made. The product is uniform and strong so that it may be readily handled and the candy basket itself will carry quite a large amount of candy within it. Obviously, I do not wish to be limited to any particular type of basket or other structure. The baskets might be heart-shaped, diamond-shaped, square or have any other shape in plan view. The base 10 might be formed with a plurality of sets of apertures for the passage of the pins 13. Thus, for instance, the middle of the base might contain apertures for a large basket, while the ends of the base might contain apertures for pins for a smaller basket or for a basket of a different shape. It is essential, however, that the upper face of the base upon which the candy is to be molded or twisted shall be perfectly smooth and highly polished and without any apertures into which the candy may sink or tend to flow.

It is to be understood that the ring or band 20 of candy may be disposed exteriorly to the pins 13 and to the edge of the bottom 15 either before or after the weaving of the candy to form the side wall of the basket, and that the same general method of manufacture may be used in the making of baskets or containers in entirely different shapes from that disclosed.

It is also to be understood as indicated at the outset of the specification that while I have herein specifically described and illustrated in the accompanying drawing, the method by which ornamental candy baskets are made, my invention is not limited to the making of baskets out of candy but comprehends the making of other articles generally. Hence in the appended claims where the term "basket" is employed, it is to be understood that this term is meant to include any candy novelty.

I claim:—

1. A method for forming candy baskets which includes forming a basket bottom of candy and placing this upon a base carrying a series of removable pins disposed in plan in accordance with the plan of the basket, and interweaving a strip of candy having an initial temperature of between 335° F. and 350° F. alternately on the outside and inside of the pins until a wall of the proper height has been completed, removing the pins and replacing with stiff candy rods, and then finishing the basket.

2. A method of forming candy baskets which includes forming a basket bottom of candy and placing this upon a base having thereon an odd number of pins arranged in a series disposed in plan in accordance with the plan of the basket, interweaving a single strip of candy having an initial temperature of between 335° F. and 350° F. alternately on the inside and outside of the pins around the figure defined by said pins until a wall of the proper height has been completed, removing the pins and replacing with stiff candy rods, and then finishing the basket.

3. A method of forming candy baskets which consists in forming a basket bottom of candy and placing this upon a base having a series of upstanding removable pins disposed in plan in accordance with the plan of the basket, interweaving an initially soft and flexible strip of candy alternately on the outside and inside of the pins until a wall of the proper height has been completed, removing the pins and replacing with stiff candy rods, and attaching an initially soft candy strip to the margins of the basket bottom and to the lower ends of the rods and the lower course of the basket wall.

4. A method of forming candy baskets which consists in forming the basket bottom of candy and placing this upon a base having a series of upstanding removable pins disposed in plan in accordance with the plan of the basket, interweaving an initially soft and flexible strip of candy alternately on the outside and inside of the pins until a wall of the proper height has been completed, removing the pins and replacing with stiff candy rods, attaching a candy strip to the margin of the basket bottom extending over the lower ends of the rods, attaching the candy strip over the upper ends of the rods and over the upper course of interwoven candy, and attaching a handle at opposite points on the wall of the basket.

5. A method of forming a candy basket which consists in forming the basket bottom of candy by taking a strip of initial softened candy and coiling it around until it reaches the proper diameter, placing this strip upon a base having thereon a series of removable upstanding pins disposed in plan in accordance with the plan of the basket, disposing a band of initially softened candy upon said base exteriorly of the pins, the pins being exterior to the edge of the bottom of the basket, interweaving a strip of initially softened candy alternately on the outside and inside of the pins until a wall of the proper height has been completed, removing the pins and replacing with stiff candy rods, disposing a band of heated and softened candy over the upper ends of the rods and over the upper course of the wall, inverting the basket and placing a strip of softened and heated candy upon the margin of the basket bottom and extending over the lower ends of said rods.

6. A method of forming a candy basket which consists in forming a basket bottom of candy by taking a strip of initially softened candy and coiling it around until it reaches the proper diameter, placing this strip upon a base having thereon a series of removable upstanding pins disposed in plan in accordance with the plan of the basket, disposing a band of initially softened candy upon said base exteriorly of the pins, the pins being exterior to the edge of the bottom of the basket, interweaving a strip of initially softened candy alternately on the outside and inside of the pins until a wall of the proper height has been completed, removing the pins and replacing with stiff candy rods, disposing a band of heated and softened candy over the upper ends of the rods and over the upper course of the wall, inverting the basket and placing a strip of softened and heated candy upon the margin of the basket bottom and extending over the lower ends of said rods and beyond the lowest course of the wall of the basket and then applying an ornamental strip of softened and heated candy to the upper face of the projecting portion of said band and engaging the lower course of the wall.

7. A method of forming candy baskets which includes the step of forming a side wall by interweaving a strip of candy having an initial temperature of between 335° F. and 350° F. backward and forward between and around a series of metallic pins to thereby form a series of interwoven courses of candy, removing the pins, and substituting therefor stiff candy rods.

In testimony whereof I affix my signature.

JAMES LAZARUS.